United States Patent
Li et al.

(10) Patent No.: US 10,641,187 B2
(45) Date of Patent: May 5, 2020

(54) CONTROLLER WITH COMBINATION FUNCTION FOR A PORTABLE INTERNAL COMBUSTION ENGINE

(71) Applicant: HANGZHOU POWER YOUNG TECHNOLOGY CO. LTD, Hangzhou (CN)

(72) Inventors: Jie Li, Hangzhou (CN); Longxin Tang, Hangzhou (CN)

(73) Assignee: HANGZHOU POWER YOUNG TECHNOLOGY CO. LTD, Hangzhou (CN)

( * ) Notice: Subject to any disclaimer, the term of this patent is extended or adjusted under 35 U.S.C. 154(b) by 126 days.

(21) Appl. No.: 15/913,874

(22) Filed: Mar. 6, 2018

(65) Prior Publication Data

US 2019/0186387 A1 Jun. 20, 2019

(30) Foreign Application Priority Data

Dec. 14, 2017 (CN) .................. 2017 2 1749299 U

(51) Int. Cl.
*F02D 19/08* (2006.01)
*F02D 19/06* (2006.01)

(52) U.S. Cl.
CPC ....... *F02D 19/061* (2013.01); *F02D 19/0623* (2013.01); *F02D 19/0678* (2013.01); *F02D 19/08* (2013.01); *F02D 19/0647* (2013.01); *F02D 19/0681* (2013.01)

(58) Field of Classification Search
CPC ............. F02D 19/061; F02D 19/0613; F02D 19/0623; F02D 19/0678; F02D 19/08; F02D 19/0681; F02D 19/0647; F16L 35/00; F16L 37/00
See application file for complete search history.

(56) References Cited

U.S. PATENT DOCUMENTS

| | | | | |
|---|---|---|---|---|
| 4,499,887 A | * | 2/1985 | Billingsley | F02M 13/06 123/575 |
| 5,816,224 A | * | 10/1998 | Welsh | F02D 19/0647 123/525 |
| 9,435,273 B2 | * | 9/2016 | Sarder | F02D 19/0647 |
| 9,476,370 B2 | * | 10/2016 | Repasky | F02D 33/003 |
| 10,107,207 B2 | * | 10/2018 | Li | F02D 11/04 |

(Continued)

*Primary Examiner* — David Hamaoui
(74) *Attorney, Agent, or Firm* — Global IP Services; Tianhua Gu

(57) ABSTRACT

A combination control assembly for dual fuel internal combustion engine comprises: a bracket (8) that is fixed on an engine shell (12); a micro switch (9) that is used to send signals; a female quick connector (7) is used to connect with the carburetor and a male quick connector (10) is used to connect with the female quick connector (7); a gas pipe (11) is used to connect with the male quick connector (10) and the other side, gaseous fuel; the bracket (8) is provided with the micro switch (9) and the female quick connector (7), the micro switch (9) is provided with a reed (91), and the male quick connector (10) is provided with a trigger tab (101). When the male quick connector (10) is connected to the female quick connector (7), the trigger tab (101) is against the reed (91). A knob component (6) is connected with the fuel valve (5) to control fuel flow in the fuel pipe (4), and the engine flameout is also controlled by the knob component (6).

8 Claims, 7 Drawing Sheets

(56) References Cited

U.S. PATENT DOCUMENTS

| | | | |
|---|---|---|---|
| 10,167,789 B2* | 1/2019 | Collie | F02D 41/0025 |
| 10,221,780 B2* | 3/2019 | Sarder | F02D 19/0605 |
| 10,267,242 B2* | 4/2019 | Tang | F02M 1/02 |
| 2015/0252928 A1* | 9/2015 | Wells | F16L 25/01 |
| | | | 285/257 |
| 2016/0222743 A1* | 8/2016 | Gosney | E21B 21/08 |
| 2016/0363099 A1* | 12/2016 | Collie | F02B 63/04 |
| 2018/0119858 A1* | 5/2018 | Rojas Lopez | F16L 37/0845 |

* cited by examiner

CONTROLLER WITH COMBINATION FUNCTION FOR A PORTABLE INTERNAL COMBUSTION ENGINE

TECHNICAL FIELD OF THE INVENTION

The invention relates generally to a portable internal combustion engine.

BACKGROUND OF THE INVENTION

The devices, such as electrical generator, pressure washer, snow blower, powered by internal combustion engines are widely used in the fields like public facilities, homes, urban construction, environmental protection etc. It is appreciated that the use of internal combustion engine improves the quality of life. But the large amount of gasoline consumed by the engines has caused serious environmental pollutions. The research for use clean energy like LPG and NG at same time in a dual fuel internal combustion engine has now received great attention.

The fuel valve, choke cable controller and flameout switch of a dual fuel engine generally are set independently, resulting in a complex operation of selecting fuel source, switching fuel valve, adjusting choke cable for a suitable air-fuel ratio, manually or electrically starting an engine, and then manipulating the flameout switch, closing fuel valve to shut down the engine. There are potential risks like, forgetting to close fuel valve, mixture of two fuels going into the engine at same time, resulting in dangerousness like, fuel leak, engine damage and fire hazard etc., when using this inefficient and complex operation of a dual fuel internal combustion engine.

SUMMARY OF THE INVENTION

The present invention is providing a single control for manipulating operation of a dual fuel internal combustion engine by using a combination control assembly.

In order to solve the above-described shortcomings:

A combination control assembly is comprising: a bracket that is fixed on an engine shell; a micro switch that is used to send signals; a female quick connector is used to connect with the carburetor and a male quick connector is used to connect with the female quick connector; a gas pipe is used to connect with the male quick connector and the gaseous fuel; the bracket is provided with the micro switch and the female quick connector; the micro switch is provided with a reed, and the male quick connector is provided with a trigger tab; when the male quick connector is connected to the female quick connector, the trigger tab is against the reed.

Preferably, also includes a knob component, a fuel valve and a fuel pipe; the knob component is connected with the fuel valve, and the knob component rotates the fuel valve to control the fuel flowing through the fuel pipe.

Preferably, also includes a control module and solenoid valve; the fuel pipe is connected with the carburetor through the solenoid valve; the micro switch sends a signal to the control module when it is triggered; the module receives the signal and control the solenoid valve to close the fuel flow.

Preferably, also includes the knob component which is provided with a contact cam, and when the knob component rotates, the contact cam is contacted with the ON/OFF switch to control the engine shutdown.

Preferably, the micro switch is provided with a first pin, and a second pin is arranged on the ON/OFF switch, the first pin is connected with the second pin, and the micro switch is in series with the ON/OFF switch.

Preferably, also includes a plate body; the plate body is provided with a first hole; the knob component comprises a rotating part and a rotation shaft; the rotation shaft is arranged on the rotating part, and is connected with the fuel valve through the first hole.

Preferably, also includes a choke cable; the plate body is provided with a second hole; the knob component has a rail, which is arranged on the rotating part; the choke cable pulls through the second hole and then contacts with the top surface of the rail, and the height of the rail is gradually rising, as rotating part drives the rail rotation, so that the rail drives the choke cable to move up and down.

Preferably, a limited block is arranged on the rotating part, and a limited post is arranged on the plate body. When the rotating part is rotated, the limited block is in contact with the limited post.

The present invention has remarkable technical effect by applying the above technical scheme.

1. The invention can realize the control of the choke cable, the fuel valve and the ON/OFF switch only by the knob component, and greatly simplifies the operation and improves the operation efficiency.

2. The invention can run out of the remaining fuel in the carburetor, and no need to use the tool to manually release the fuel, preventing the corrosion of the carburetor, fuel deterioration and gummy sticky residue blocking the carburetor jet due to the engine putting aside for a long time.

3. The invention has the advantages of simple and compact structure, convenient operation, safety and reliability, and could be widely applied to engines and other equipment.

4. The invention can control the gasoline flow through by cutting off the solenoid valve triggered with the trigger tab and the micro switch, thus avoiding two kinds of fuel entering the engine and reducing the engine performance instability 5. The invention can enable the LPG to easily enter the carburetor through the female quick connector and the male quick connector, and it's easy to connect and use.

6. The invention prevents LPG from not entering carburetor through the combination control assembly operation, but enables its entry through the micro switch and ON/OFF switch operation, so not turn off the engine unless the user cuts off the LPG source which could avoid gas leakage protect user's health and improve operation safety.

BRIEF DESCRIPTION OF THE DRAWINGS

The present invention is described in detail below with 8 drawings in which.

Above drawings illustrate of each parts with the digital labels as follows: 1—choke cable, 2—plate body, 21—first hole, 22—second hole, 23—limited post, 3—ON/OFF switch, 31—second pin, 4—fuel pipe, 5—fuel valve, 6—knob component, 61—rail, 62—rotation shaft, 63—limited block, 64—rotating part, 65—contact cam, 7—female quick connector, 8—bracket, 9—micro switch, 91—reed, 92—first pin, 10—male quick connector, 101—trigger tab, 11—gas pipe, 12—engine shell.

EMBODIMENTS OF THE INVENTION

Reference is made to the accompanying drawings in which its features and advantages will be apparent.

Figure 1:
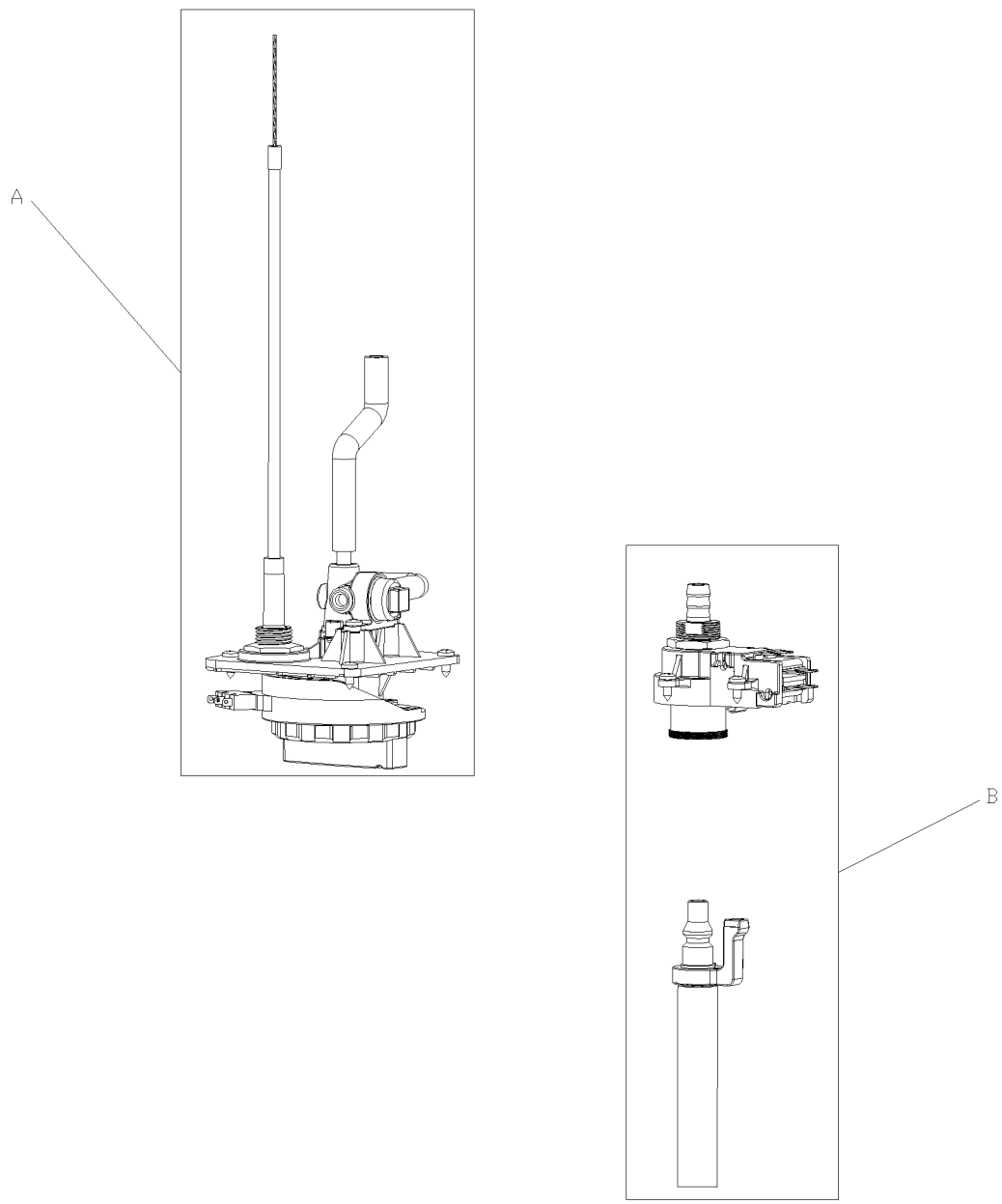
FIG. 1 is a front view of the combination control assembly.
Figure 2:
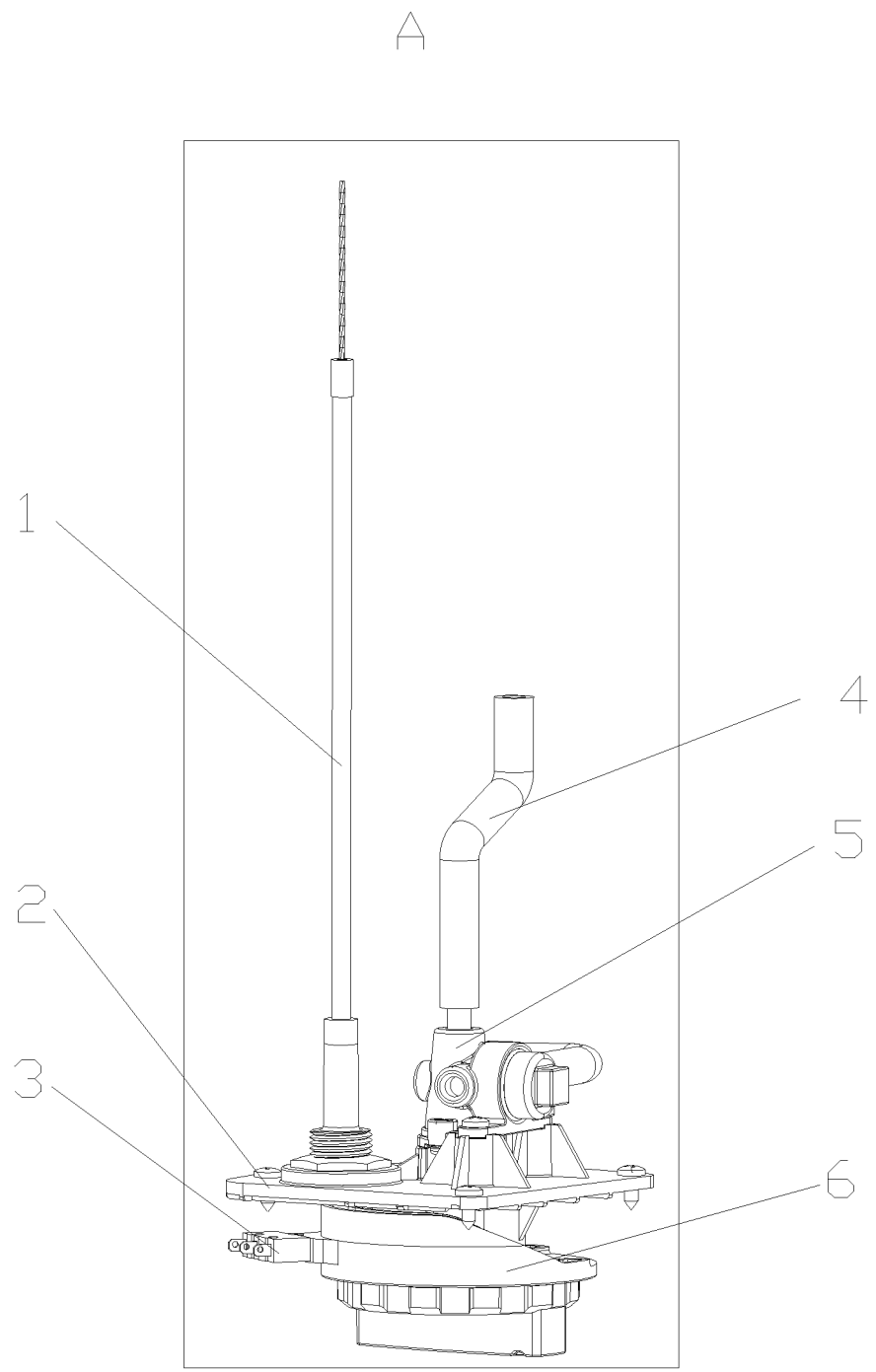
FIG. 2 is an enlarged view of the area "A" shown in FIG. 1.
Figure 3:
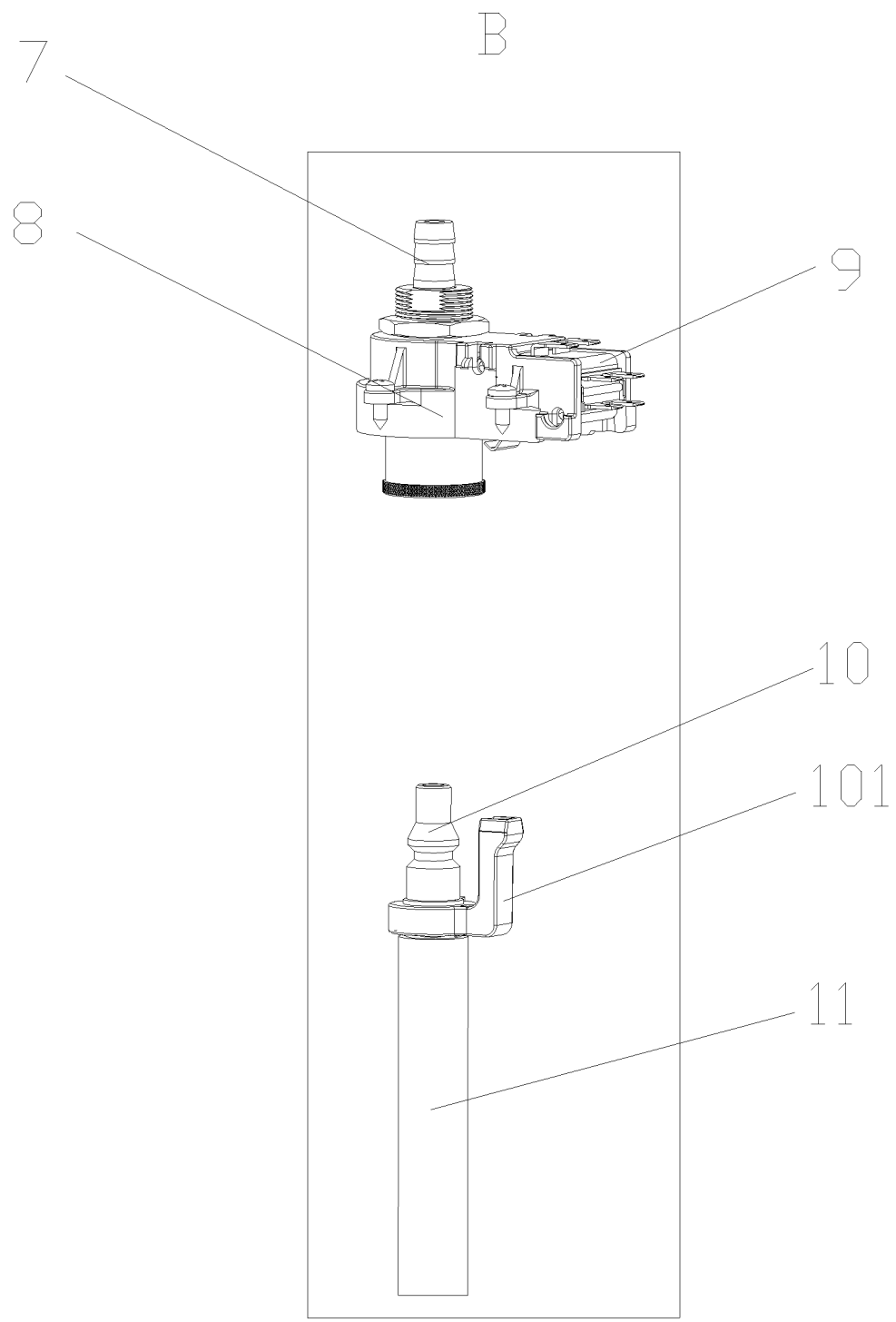
FIG. 3 is an enlarged view of the area "B" shown in FIG. 1.
Figure 4:
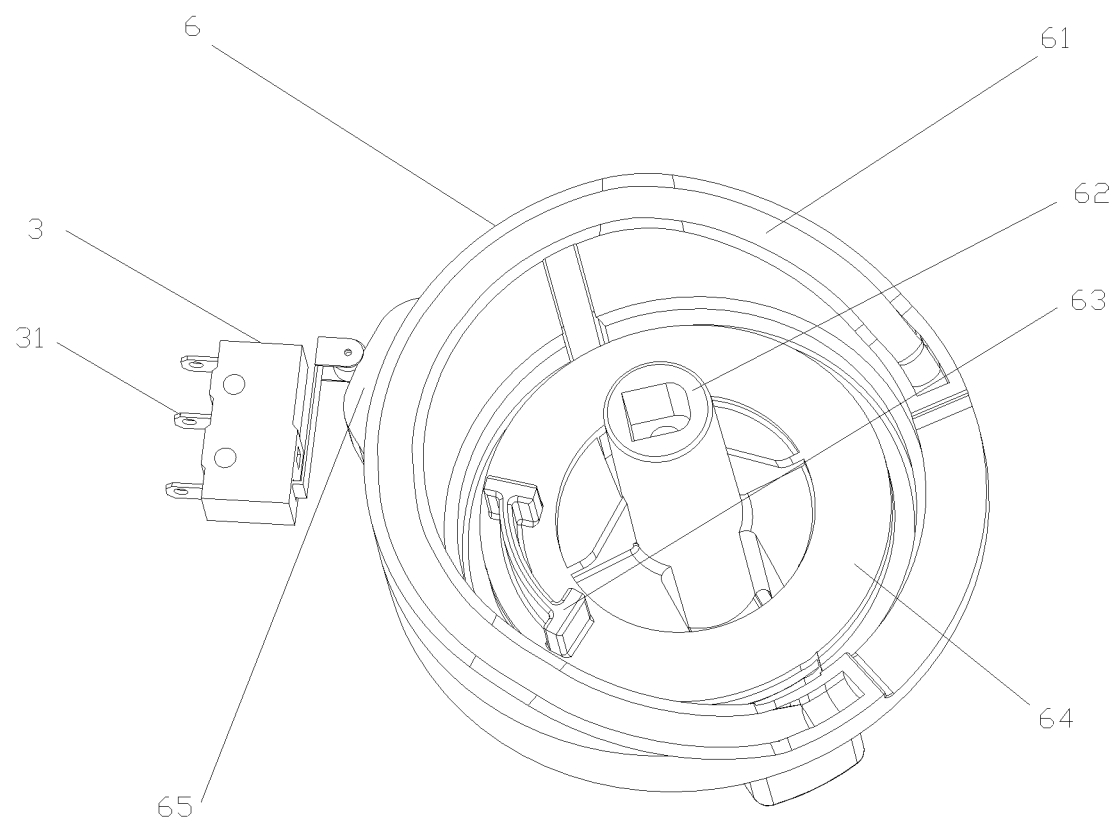
FIG. 4 is a schematic view of the ON/OFF switch and the knob component.
Figure 5:
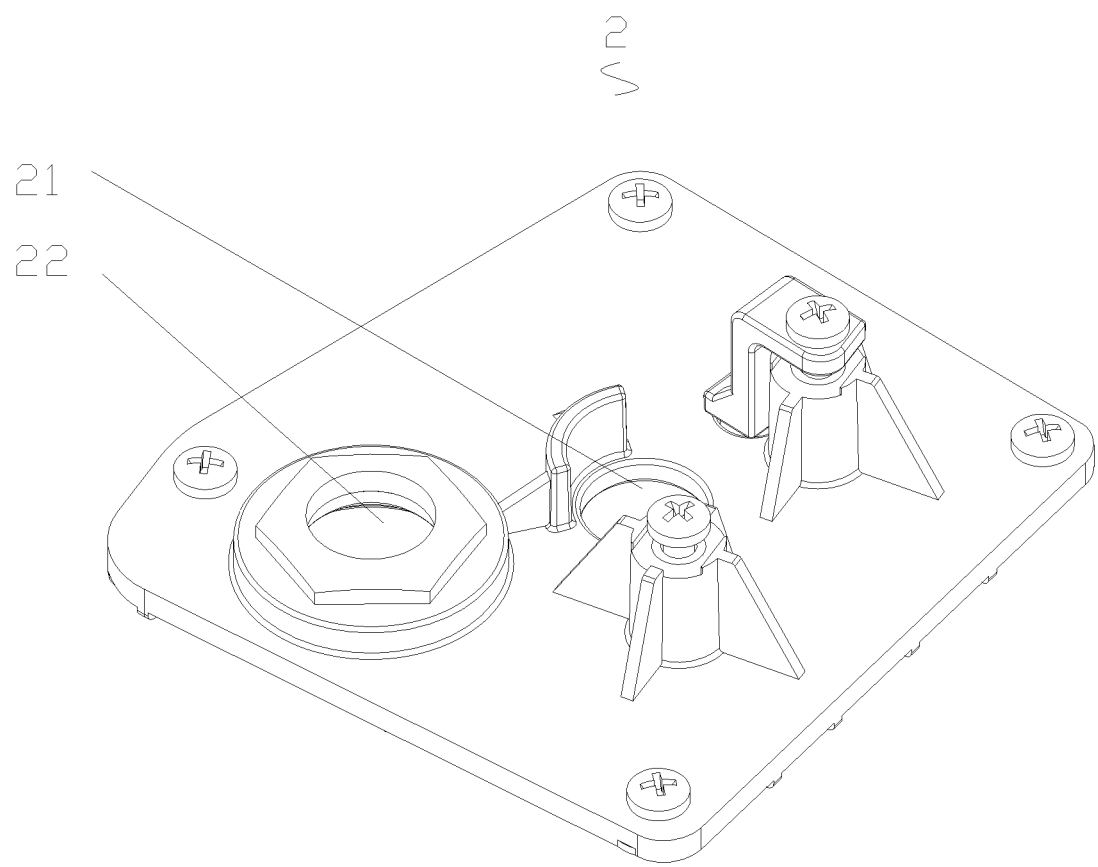
FIG. 5 is a schematic view of the first viewing angle of the plate body
Figure 6:
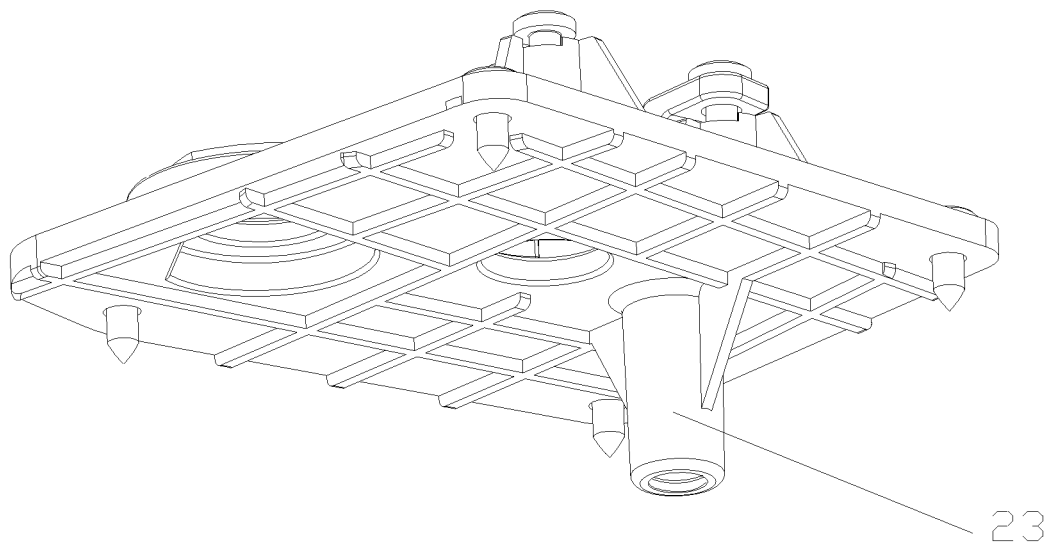
FIG. 6 is a schematic view of the second viewing angle of the plate body
Figure 7:
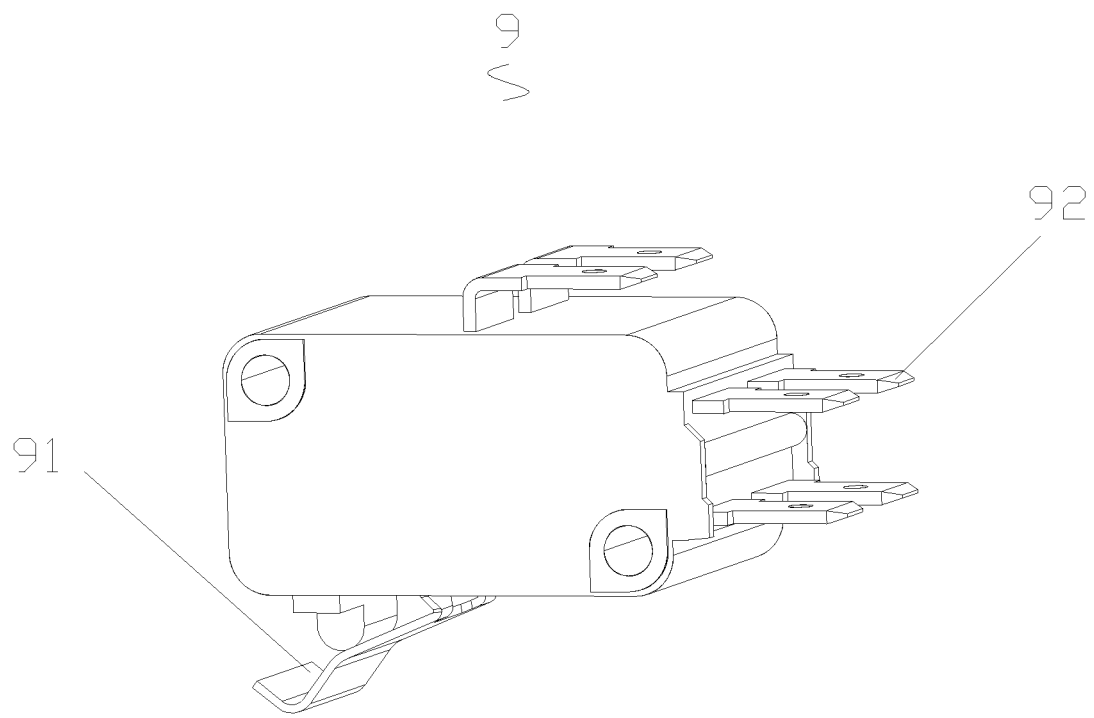
FIG. 7 is a schematic view of the micro switch.
Figure 8:
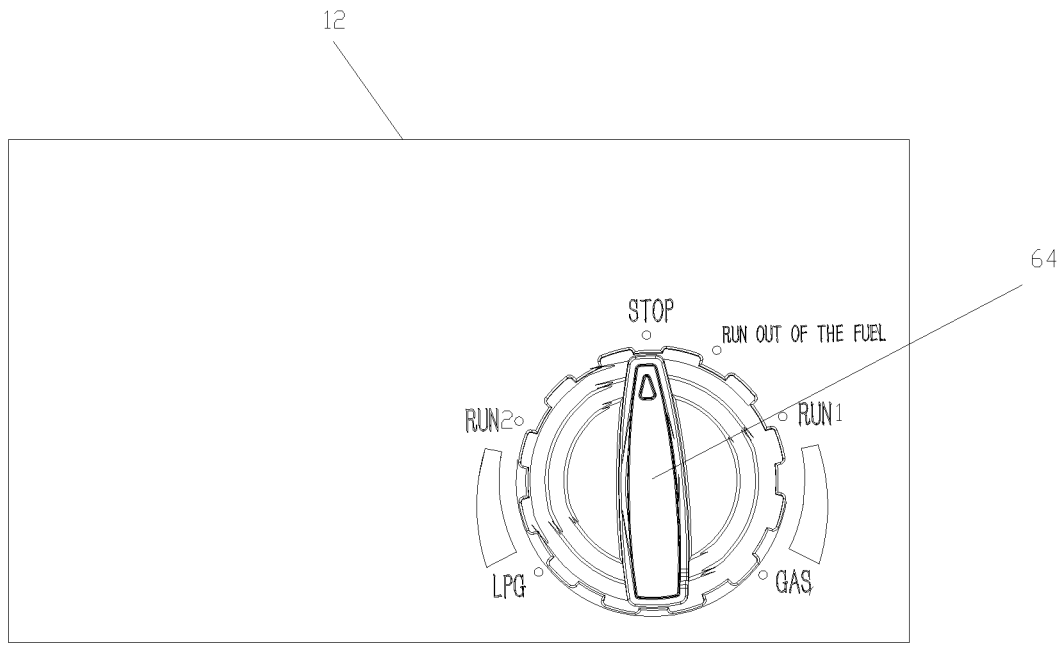
FIG. 8 is a schematic view of the engine shell and rotating part.

A combination control assembly is shown in greater detail in FIG. 1-8 comprising: a bracket 8 that is fixed on an engine shell 12; a micro switch 9 that is used to send signals; a female quick connector 7 is used to connect with the carburetor and a male quick connector 10 is used to connect with the female quick connector 7; a gas pipe 11 is used to connect with the male quick connector 10 and the gaseous fuel; the bracket 8 is provided with the micro switch 9 and the female quick connector 7; the micro switch 9 is provided with a reed 91, and the male quick connector 10 is provided with a trigger tab 101. When the male quick connector 10 is connected to the female quick connector 7, the trigger tab 101 is against the reed 91.

Also includes a knob component 6, a fuel valve 5 and a fuel pipe 4. The knob component 6 is connected with the fuel valve 5, and the knob component 6 rotates the fuel valve 5 to control the fuel flowing through the fuel pipe 4.

Also includes a control module and solenoid valve, the fuel pipe 4 is connected with the carburetor through the solenoid valve; micro switch 9 sends a signal to the control module when it is triggered; the module receives the signal and control the solenoid valve to close.

Also includes a the knob component 6 which is provided with a contact cam 65, and when the knob component 6 rotates, the contact cam 65 is contacted with the ON/OFF switch 3 to control the engine shutdown. The micro switch 9 is provided with a first pin 92, and a second pin 31 is arranged on the ON/OFF switch 3, the first pin is 92 connected with the second pin 31, and the micro switch 9 is in series with the ON/OFF switch 3.

Also includes a plate body 2. The plate body 2 is provided with a first hole 21. The knob component 6 comprises a rotating part 64 and a rotation shaft 62. The rotation shaft 62 is arranged on the rotating part 64, and is connected with the fuel valve 5 through the first hole 21. Also includes a choke cable 1. The plate body 2 is provided with a second hole 22. The knob component 6 has a rail 61, which is arranged on the rotating part 64. The choke cable 1 pulls through the second hole 22 and then contacts with the top surface of the rail 61, and the height of the rail 61 is gradually rising, as rotating part 64 drives rail 61 rotation, so that the rail 61 drives the choke cable 1 to move up and down, and when the choke cable 1 is lifted, the choke is gradually opened.

The limited block 63 is arranged on the rotating part 64, and the limited post 23 is arranged on the plate body 2. When the rotating part 64 is rotated, the limited block 63 is in contact with the limited post 23. Then the rotating part 64 is restricted by the limited block 63 and the limited post 23.

The bracket 8, plate body 2 and ON/OFF switch 3 are set on the engine shell 12 with the label "GAS", "RUN1", "RUN OUT Of FUEL", "STOP", "RUN2" and "LPG".

Operation Process as Follows:

Start Position Gasoline

When the rotating part 64 in "GAS" while fuel valve 5 is partially opened, gas flows through the fuel pipe 4 into the carburetor, choke completely off, ON/OFF switch 3 in off State; rotate the rotating part 64 in the "gas" to "RUN1" angle range, the fuel valve 5 and choke are gradually opened to the maximum position. At any location within this range, the operator can start the engine according to engine status and environmental conditions.

RUN-1 Gasoline

When rotate the rotating part 64 from "GAS" To "RUN1" while fuel valve 5 gradually opens to reach the "RUN1" position, the fuel valve 5 opening to the maximum, and choke cable 1 sliding along the rail 61, due to the height of the rail 61 is gradually rising, choke opening angle increases. When the knob is turned to the "RUN1" position, the choke is completely opened.

RUN OUT OF FUEL Gasoline

Continue to rotate the rotating part 64 counterclockwise, the fuel valve 5 of the oil gradually reduces, and the choke keeps fully open. When the user is not ready to use the engine for a long time, rotate to "RUN out of the FUEL" position, at this time the fuel valve 5 is completely shut down, the choke is still completely open, and the engine continues to run. When the carburetor fuel burns out, the engine flameout, thus avoiding the use of tools to manually drain the residue fuel in carbutor bowl, simplifying the operation.

STOP

Continue to rotate the rotating part 64 to the "STOP" position, then ON/OFF switch 3 is touched by the contact cam 65, the ON/OFF switch 3 is turned on, and engine flameout to stop operation.

Start Position LPG

When the rotating part 64 is in the "LPG" position and the male quick connector 10 is connected to the female quick connector 7, the trigger tab 101 is against the micro switch 9 reed 91, the micro switch 9 sending signal to the control module so to close the solenoid preventing the gasoline from entering the engine combustion chamber when the engine burns the LPG, reducing the instability of the engine due to the simultaneous entry of the two fuels; at this moment the choke is completely shut down. Rotate the rotating part 64 in the "LPG" to "RUN2" angle range, the fuel valve 5 is always in the closed state, LPG flowing through the gas pipe 11, male quick connector 10 and female quick connector 7 into the carburetor, meantime the choke is gradually opened to maximum, and in any position within the range, the operator can start the engine according to the engine state and environmental conditions.

RUN-2 LPG

When rotate the rotating part 64 from "LPG" to "RUN2" while fuel valve 5 has been turned off, LPG flows through gas pipe 11, male quick connector 10 and female quick connector 7 into the carburetor, while the opening angle of the choke is gradually increased, and the choke is fully open when the knob is in the "RUN2" position.

STOP

Continue to rotate the rotating part 64 to "stop" position, when the ON/OFF switch 3 is touched by the contact cam 64, due to the micro switch 9 and the ON/OFF switch 3 are connected in series, the ON/OFF switch 3 is shielded, so the engine will not flameout. For security reasons, the engine can only be turned off by disconnecting the external LPG fuel, so to avoid the engine being turned off while LPG still inputs, which effectively improves the operation safety of the engine.

In a word, above description is only one preferred application of our design and all the equivalents derived from it, shall be covered by this claimed invention and shall not utilize unless authorized.

What is claimed is:

1. A controller with combination function for a dual fuel internal combustion engine comprising:
   a bracket (8) fixed on an engine shell (12);
   a micro switch (9) used to send signals;
   a female quick connector (7) used to connect with a carburetor;
   a male quick connector (10) used to connect with the female quick connector (7);
   a gas pipe (11) used to connect the male quick connector (10) with a gaseous fuel supply;
   the micro switch (9) and the female quick connector (7) are fixed on the bracket (8), the micro switch (9) has a reed (91), the male quick connector (10) has a trigger tab (101); and
   when the male quick connector (10) is connected to the female quick connector (7), the trigger tab (101) is against the reed (91).

2. The controller with combination function according to claim 1, wherein the controller further includes a knob component (6), a fuel valve (5) and a fuel pipe (4); the knob component (6) is connected with the fuel valve (5), and the knob component (6) rotates the fuel valve (5) to control the fuel flowing through the fuel pipe (4).

3. The controller with combination function according to claim 2, wherein the controller further includes a control module and a solenoid valve; the fuel pipe (4) is connected with the carburetor through the solenoid valve; the micro switch (9) sends a signal to the control module when it is triggered; the control module controls the solenoid valve to close fuel flow after receiving the signal from the micro switch (9).

4. The controller with combination function according to claim 2, wherein the knob component (6) has a contact cam (65), when the knob component (6) rotates, the contact cam (65) is contacted with a ON/OFF switch (3) to control the portable internal combustion engine shutdown.

5. The controller with combination function according to claim 4, wherein the micro switch (9) has a first pin (92), the ON/OFF switch (3) has a second pin (31), the micro switch (9) is connected with the ON/OFF switch (3) in series by connecting the first pin (92) with the second pine (31) together.

6. The controller with combination function according to claim 2, wherein the controller further includes a plate body (2); the plate body (2) has a first hole (21); the knob component (6) comprises a rotating part (64) and a rotation shaft (62); the rotation shaft (62) is arranged on the rotating part (64), and is connected with the fuel valve (5) through the first hole (21).

7. The controller with combination function according to claim 6, wherein the controller further includes a choke cable (1); the plate body (2) has a second hole (22); the knob component (6) has a rail (61), which is arranged on the rotating part (64); the choke cable (1) contacts with the top surface of the rail (61) by passing through the second hole (22), the rail (61) has a gradually rising height, the rotating part (64) drives the rail (61) rotation, so that the rail (61) drives the choke cable (1) up or down.

8. The controller with combination function according to claim 6, wherein a limiting block (63) is arranged on the rotating part (64), and a limiting post (23) is arranged on the plate body (2), when the limiting block (63) is in contact with the limiting post (23) the rotating part (64) is stopped.

* * * * *